United States Patent

Udelle et al.

Patent Number: 5,540,187
Date of Patent: Jul. 30, 1996

[54] ANIMATED BALL AND TRACK ATTRACTANT DEVICE FOR CATS

[76] Inventors: Steven D. Udelle; Laura L. Udelle, both of 26414 Barranquilla Ave., Punta Gorda, Fla. 33983

[21] Appl. No.: 350,327
[22] Filed: Dec. 6, 1994
[51] Int. Cl.⁶ .................................................. A01K 29/00
[52] U.S. Cl. .............................. 119/706; 119/707; 446/136
[58] Field of Search ................................ 119/707, 711, 119/702, 706; 446/131, 136, 168, 170

[56] References Cited

U.S. PATENT DOCUMENTS

| | | | |
|---|---|---|---|
| 2,594,678 | 4/1952 | Parke et al. | 446/136 |
| 2,958,181 | 11/1960 | Laughlin | 446/136 |
| 3,986,296 | 10/1976 | Hamano | 446/136 |
| 4,722,299 | 2/1988 | Mohr | 119/29 |
| 4,770,123 | 9/1988 | Bell | 119/709 |
| 4,838,825 | 6/1989 | Hwang et al. | 446/136 |
| 4,871,340 | 10/1989 | Ross | 446/132 |
| 5,009,193 | 4/1991 | Gordon | 119/706 |
| 5,269,261 | 12/1993 | McCance | 119/706 |
| 5,351,650 | 10/1994 | Graves | 119/707 |
| 5,390,629 | 2/1995 | Simone | 119/711 |

FOREIGN PATENT DOCUMENTS 1965659  7/1971  Germany ............................ 446/136

*Primary Examiner*—Todd E. Manahan

[57] ABSTRACT

An animated ball and track attractant device for cats, employing a circular housing 54 containing a miniature motor 62 within its confines, and having an elongated sweep arm mounted at a right angle to the motor output shaft 64. Both sweep arm ends 66 and 68 have permanent magnets 70 and 72 attached thereto, whereby a ball 60 containing a loose permanent magnet 60a within, is attracted to either magnet 70 or 72, thus causing the ball to simultaneously spin and hop as it orbits around an annular track 58, adjacent to the peripheral edge of the circular housing 54, thereby attracting a cat into imminent play with the device.

16 Claims, 4 Drawing Sheets

FIG. 1a
FIG. 1b
FIG. 1c
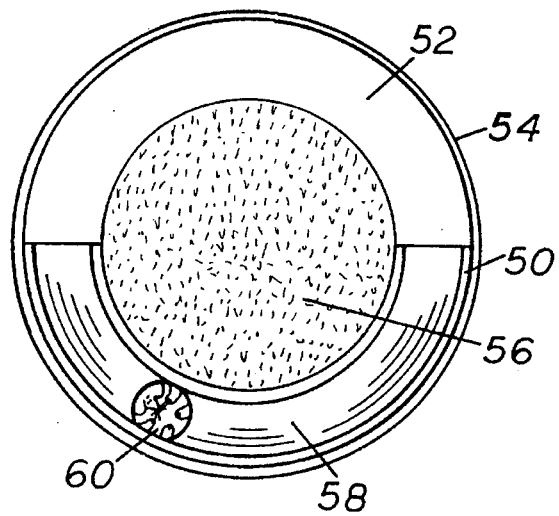
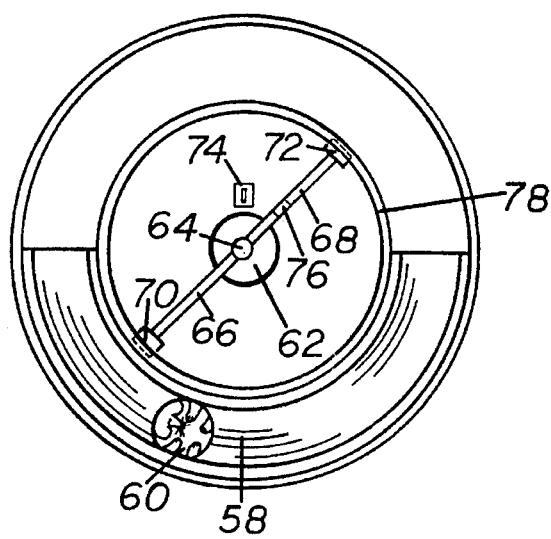
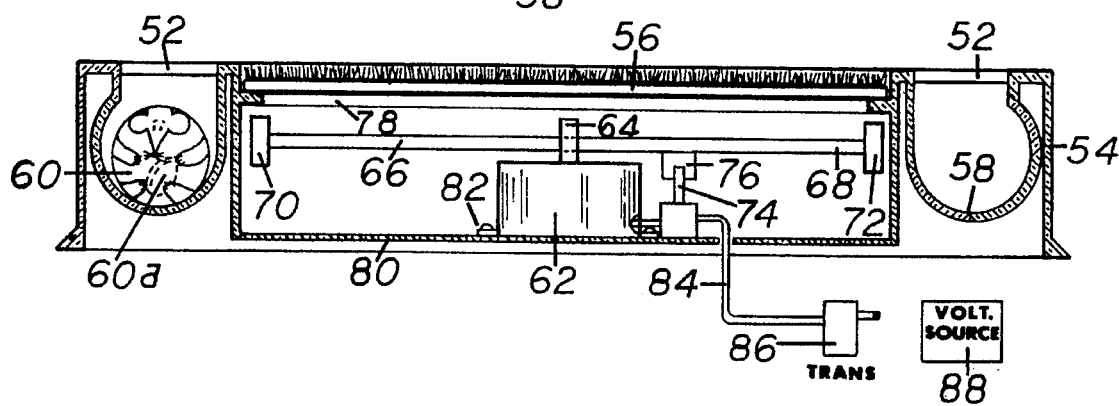

1

ANIMATED BALL AND TRACK ATTRACTANT DEVICE FOR CATS

BACKGROUND

1. Field of the Invention

The present invention deals with animal exercise devices, and more particularly to an animal exercise stimulator that provides motion as a compelling attraction to an animal, whereby an animal will frequent the exercise device on its own initiative more often, thereby improving its physical condition, health, and mental alertness through its own efforts.

2. Discussion of the Prior Art

Exercise devices past and present are static, or have a movable object on, around, or within these devices. An animal is usually shown by demonstration the movable or rolling object in the device, whereby the animal's inherent instinct to attack, or play with a moving object takes over. However, these objects have to be initially moved by an animal or a human to begin with, and unfortunately a good device becomes unused for long periods of time and just takes up space. Cats can easily become obese and listless from lack of frequent exercise over a period of time. The prior art more closely associated to the present invention are U.S. Pat. No. 4,722,299, by Mohr, Feb. 2, 1988, which shows a toy with a closed loop or track, containing a loose ball inside the track housing. The ball is captive within the housing and is exposed to the continuous opening of the inside edge of the loop. A cat can swat the ball around the track by putting its paw through a continuous opening inside the loop's vertical side. U.S. Pat. No. 5,269,261, by McCance, Dec. 14, 1993, shows a similar device to Mohr, wherein the ball is visible at the top of the track, and the center portion of the loop contains a replaceable corrugated cardboard scratching pad. U.S. Pat. No. 4,871,340, by Ross, Oct. 3, 1989, shows a hand held, magnetic toy track having a rolling, permanent magnet. By becoming adept at moving the device by hand, a magnet is caused to roll around the saucer shaped track. The above prior art devices are dormant when not in use. The prior art does not teach on the important motivational means of providing an irresistable incentive or attraction for an animal, whereby the animal would get the much needed exercise by using their devices more often. The present invention takes advantage of the inherent instincts of an animal's response to a moving object, when the original movement of the object is not physically initiated by the animal or human hand.

SUMMARY OF THE INVENTION

The present invention utilizes the phenomena of invisible or unseen forces of magnetic fields. In the space around every permanent or electromagnet, there exists a magnetic field. A magnetic field is an example of the physical phenomenon known as a force field. A magnetic field can be visualized as consisting of lines of magnetic force or flux, originating at a north pole and ending at a south pole and is defined as the direction of the magnetic field. When placing several magnets in close proximity to each other, the unlike poles will attract and the like poles will repel. The basis of the present invention deals with invisible or unseen force fields and their action and reaction when employing several objects with magnets in close proximity to each other. Generally, the preferred embodiment of the present invention is comprised of a circular housing of sufficient diameter; including a base surface, a top surface, and a vertical side surface of sufficient height, further including an electric motor mounted to the base surface, wherein a sweep arm is coupled at a right angle to the motor shaft. The sweep arm has a primary, permanent, ceramic magnet affixed to each opposite end of the sweep arm. A recessed, closed circuit pathway adjacent the perimeter of the housing confines a ball shaped lure containing a loose, secondary, ceramic, permanent magnet within its shell. A circular, carpeted platform affixed atop the housing conceals the motor mechanism while providing a scratching surface for an animal's claws. Half of the recessed, closed circuit pathway is covered and conceals the movable object or ball shaped lure, and the other half of the pathway exposes the ball shaped lure, thereby presenting a hide and seek of the ball shaped lure to a cat. The electric motor rotates the sweep arm with primary, permanent magnets attached thereto at a predetermined speed, 10 to 20 RPM. The ball shaped lure containing a loose, secondary, permanent magnet within its shell, responds to the influence projected by both force fields, causing the ball shaped lure to intermittantly spin and hop as it orbits around the exposed half of the recessed pathway. The erratic behavior of the exposed ball lure becomes irresistable to a cat, thereby creating a fast action by the cat to capture the ball lure before it escapes into the concealing lure closure.

It is therefore an object of the present invention to provide an animal exercise stimulating device that does not require an animal or a human hand to initiate the movement of the lure.

It is another object of the invention to activate the device when the animal is in its most active period two to three times a day for a duration of thirty minutes each.

It is an object of the invention to have an animal expend its surplus energy at scheduled intervals, thereby developing improved muscle tone, alertness, coordination, and better sleeping habits.

It is an object of the invention that upon activation of the device, a cat will always respond to the moving lure.

It is another object of the invention that the exercise stimulator would relieve the animal from boredom by providing amusement, thereby saving areas of household furniture from damage.

Another object of the invention is that an enticement such as catnip, would no longer be required.

Other objects and advantages may be readily determined by the following descriptions.

BRIEF DESCRIPTION OF THE DRAWINGS

FIG. 1a is a top plan view of the preferred embodiment of the present invention showing a ball shaped lure confined within a recessed, orbiting pathway guide, partially exposed and partially concealed. The circular housing has a carpeted platform surface.

FIG. 1b is a top plan view of the circular housing showing a motorized mechanism within the central portion of the housing.

FIG. 1c is a plan side view of the circular housing showing the component arrangement. The electric motor rotates an arm containing a permanent magnet at opposite ends. A magnetic ball shaped lure caught in the magnetic force field orbits around the recessed pathway guide one revolution clockwise, and then counterclockwise as a sweep arm blade activates a double pole, double throw, motor reversing switch.

COMPLETE DESCRIPTION OF THE INVENTION

Figure 2A:
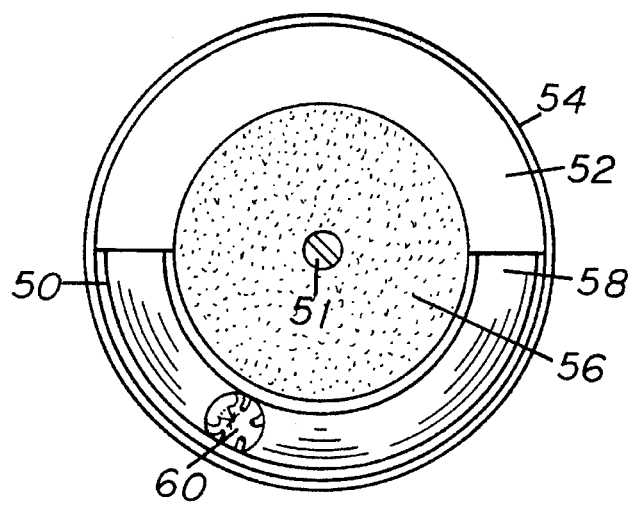
FIGS. 2a, 2b, and 2c are an alternate embodiment of FIGS. 1a, 1b, and 1c. The difference being a mechanical spring wound motor is used in place of an electric motor. The spring wound motor has an elongated, permanent bar magnet affixed to its shaft, and the shaft extends upwards and is affixed to a wind-up knob. The mechanical spring wound motor rotates the elongated, permanent bar magnet. A magnetic, ball shaped lure caught in the magnetic force field, orbits around the recessed pathway guide in a continuous, unchanging, counterclockwise orbit.

FIG. 1a is a plan top view of a preferred embodiment of the present invention showing a top edge 50 of a circular housing 54, a carpeted platform surface 56, a partially exposed recessed closed circuit pathway guide 58 resembling a trough, a partially concealed portion of the recessed closed circuit pathway guide having a cover 52, and a movable ball shaped lure 60 confined within the recessed pathway guide.

FIG. 1b is a plan top view with the carpeted platform surface 56 of FIG. 1a removed, exposing the platform mounting ledge 78, and showing a motor mechanism within the device, comprised of a motor 62, motor output shaft 64, a sweep arm 68 mounted at a right angle to motor output shaft 64 having a primary permanent ceramic magnet 72 affixed at its outer end, and a blade 76 affixed and projecting below sweep arm 68 for activating the motor reversing switch 74. The other end of the sweep arm 66 has a permanent magnet 70 affixed thereto.

FIG. 1c is a plan side view in cross section of the device housing 54 comprised of a top carpeted platform surface 56 and mounting ledge 78, a partially exposed, recessed closed circuit pathway guide 58 resembling a trough, a partially concealed portion of the recessed closed circuit pathway guide enclosed with a cover 52, including a movable object or ball shaped lure 60 containing a loose, secondary permanent magnet 60a shown in hidden lines within its shell. Further including a motorized mechanism comprising a motor 62, mounted to a base 80 by fasteners 82, a sweep arm 68 mounted at a right angle to the motor output shaft 64 having a primary permanent magnet 72 affixed at its outer end, and a blade 76 affixed and projecting below sweep arm 68 for activating the motor reversing switch 74. The other end of the sweep arm 66 has a primary permanent magnet 70 affixed thereto, further including a voltage source 88 providing power to motor 62 via transformer/plug 86, and wiring 84 connected to reversing switch 74 and motor. The reduced voltage is harmless to an animal should he chew into the cord. The ball shaped lure 60, containing a loose secondary permanent magnet 60a within its shell, orbits the confines of the recessed closed circuit pathway guide or trough 58, through the interacting influence of the primary and secondary permanent magnet force fields, producing a hide and seek effect, as the ball shaped lure spins and hops throughout the exposed portion of the recessed pathway guide. Referring back to FIGS. 1b and 1c, the sweep arm 68 can travel one revolution clockwise and one revolution counterclockwise. Each time the switch blade 76 under sweep arm 68 trips the double pole, double throw, reversing sweep switch 74, the sweep arm 68 will reverse its direction, and after a full rotation will trip the reversing switch 74, and again reverse direction. This event is continuous when the device is energized. When the force field of the secondary lure magnet 60a interacts with the influence of the force field of the primary magnet 70, when in a counterclockwise rotation, the reversing switch 74 will present the orbiting lure alternately from left to center and then from right to center of the exposed portion of the pathway guide 58. When the force field of the primary magnet 72 is interacting with the force field of the secondary lure magnet 60a, the reversing switch 74 will present the orbiting lure alternately clockwise, and then counterclockwise across the entire exposed recessed pathway guide 58. These various appearances and disappearances of the spinning and hopping animated lure, intrigues and excites a cat for extended periods of time.

Figure 2B:
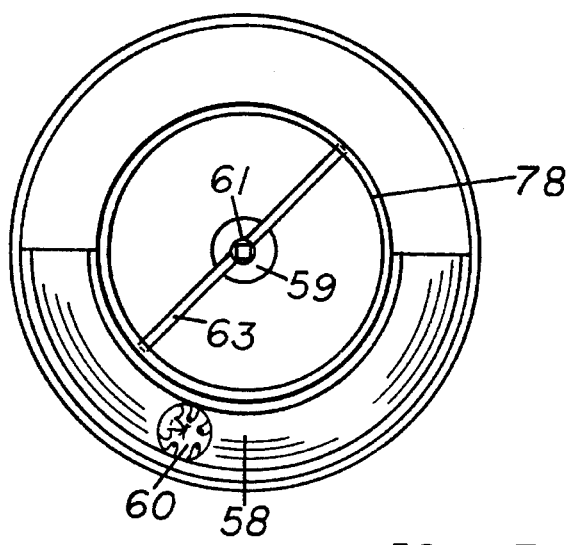
Figure 2C:
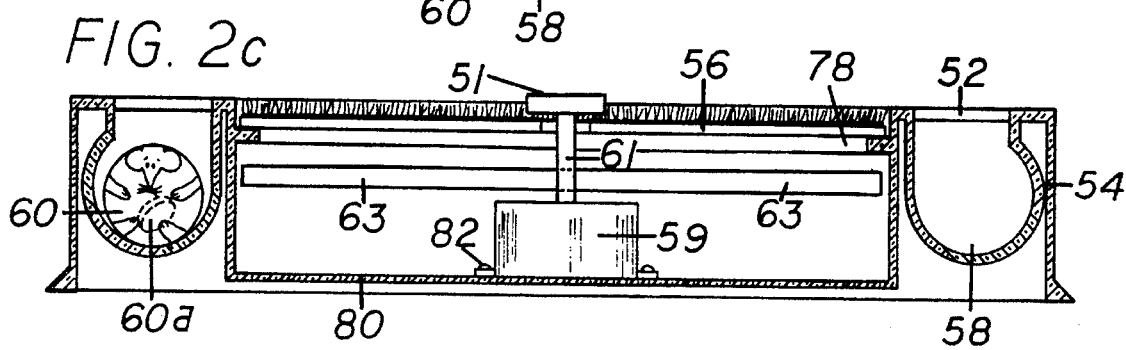

FIGS. 2a, 2b, and 2c are at alternate embodiment of FIGS. 1a, 1b, and 1c, in respect to the circular housing 54.

FIG. 2a shows a wind-up knob 51 installed flush with the carpeted top platform surface 56.

FIG. 2b shows an alternate motor mechanism comprised of a mechanical spring wound motor 59, a motor output shaft 61 and an elongated, primary magnet bar 63 possessing an unseen force field.

FIG. 2c shows an alternate plan side view, displaying the positions of the motor mechanism, comprising a mechanical spring wound motor 59, an output shaft 61 extending vertically upward through an opening in the carpeted top platform surface 56, and including a motor wind-up knob 51 flush with the carpeted top platform surface 56. The operation of this alternate exercise stimulator device is as follows: wind-up knob 51 is activated by human fingers, causing the spring wound motor 59 to rotate output shaft 61 in a continuous counterclockwise direction for a period of 4 minutes at about 3 RPM. The elongated primary magnet 63 affixed at a right angle to the output shaft 61 turns at the same RPM as the spring wound motor 59. A movable ball shaped lure 60 containing a loose secondary permanent magnet 60a possessing an unseen force field is confined within a recessed, closed circuit pathway guide 58 resembling a trough. The movable ball shaped lure 60 responds to the influence projected by both force fields, causing an intermittant spinning action as it orbits the pathway guide 58 at the same RPM as the primary bar magnet 63. This device is useful, as it serves to stimulate a cat into action thereby providing a period of healthy exercise and amusement that continues after the motor has stopped.

Figure 3A:
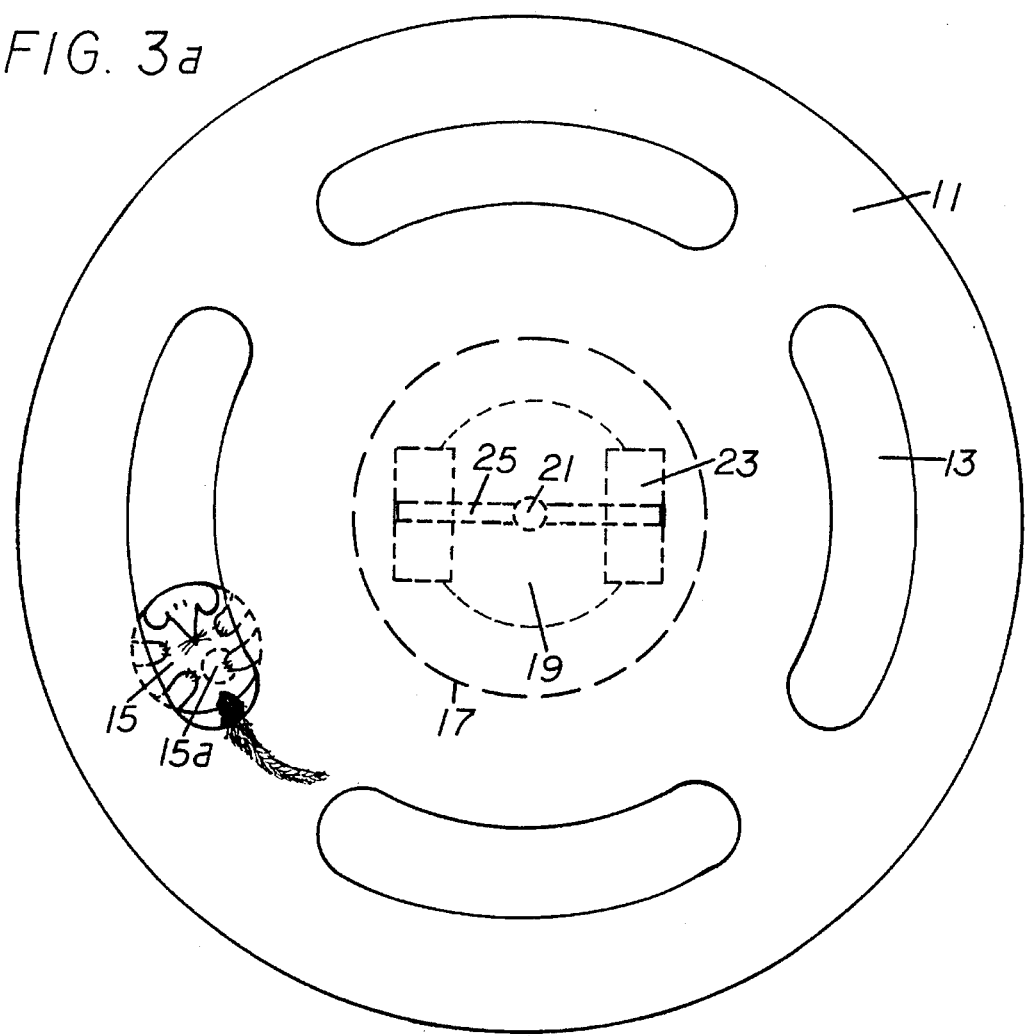
FIG. 3a is a top plan view of an alternate embodiment of FIGS. 1a, 1b, and 1c, showing a confined, magnetic, ball shaped lure and a concealed motor mechanism in hidden lines.

FIG. 3a is a top plan view of an alternate embodiment of FIG. 1a showing the top of a circular housing 11 with a plurality of elongated, slotted openings 13 of sufficient size to admit the paw of a cat therethrough. A movable ball shaped lure with a tail 15 contains a secondary, permanent magnet possessing an unseen force field within its shell. The circular housing wall 17 and motor mechanism is shown in hidden lines.

Figure 3B:
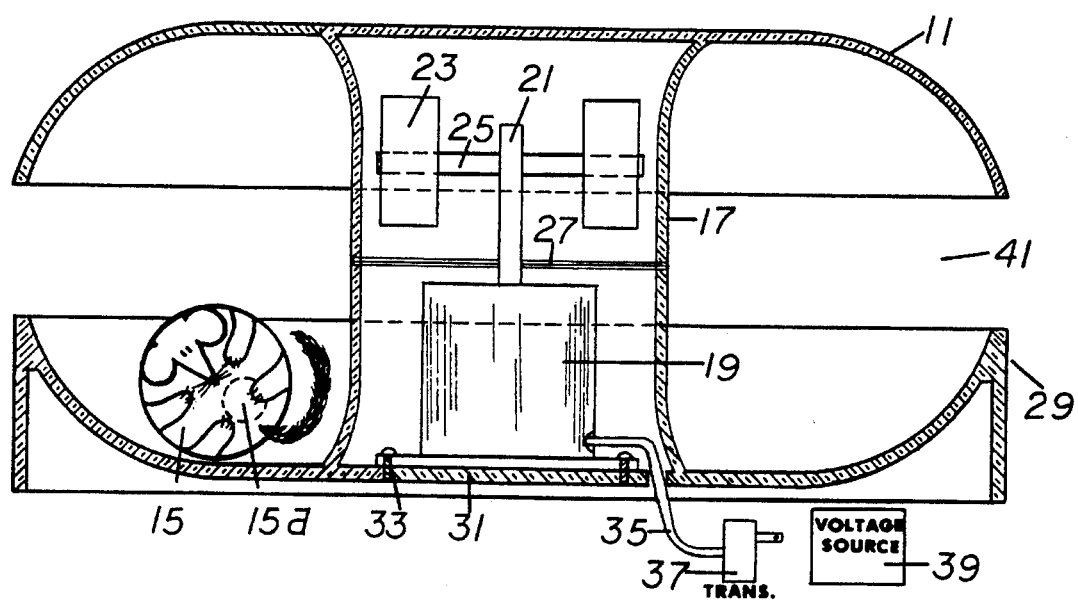
FIG. 3b is a side plan view of the circular housing shown in cross-section, comprised of an electric motor, motor shaft, sweep arm, and a permanent magnet attached to opposite ends of the sweep arm.

FIG. 3b shows a plan side view in cross section of the device housing 11, 29 and 17. The top portion of housing 11 is connected to lower housing 29 by a snap fit arrangement 27 of vertical wall 17. The mechanism assembly is comprised of a motor 19 mounted to a base 31 by fasteners 33, a motor output shaft 21 connected to a sweep arm 25 at a right angle to output shaft 21, a plurality of primary, permanent, ceramic magnets 23 possessing a constant, emanating unseen force field, affixed at opposite ends of sweep arm 25, a voltage source 39 providing power via transformer/plug 37 to wires 35 connected to motor 19, further including a movable ball shaped object or lure with an exterior tail 15 containing a loose secondary permanent magnet 15a possessing a constant, emanating unseen force field within its shell, a continuous lateral opening 41 of sufficient size to accommodate an animal's paw therethrough and extending around the entire perimeter side of the device. The motor speed for this device works sufficiently at 100 RPM. Any RPM between 5 and 150 can be used. The upper speed ranges produce a variety of ball shaped lure movements. For example: 100 RPM produces an eccentric hopping spin with a rapid flailing of the lure tail simultaneously as it orbits the device enclosure. The lure does not orbit at the motor speed, but is influenced to move around the circuitous pathway, by the physical phenomena of a primary force field action, and the secondary force field's reaction. The loose secondary magnet in the lure ball is constantly changing its force field pattern angle, in respect to the predictable primary force field, thus causing the lure to react in an unusual manner and is very exciting to cats. At 100 RPM, the lure does between 15 and 20 orbits per minute. Adjusting the position of the primary permanent magnets up or down the motor shaft will affect lure movement in various ways.

Figure 4:
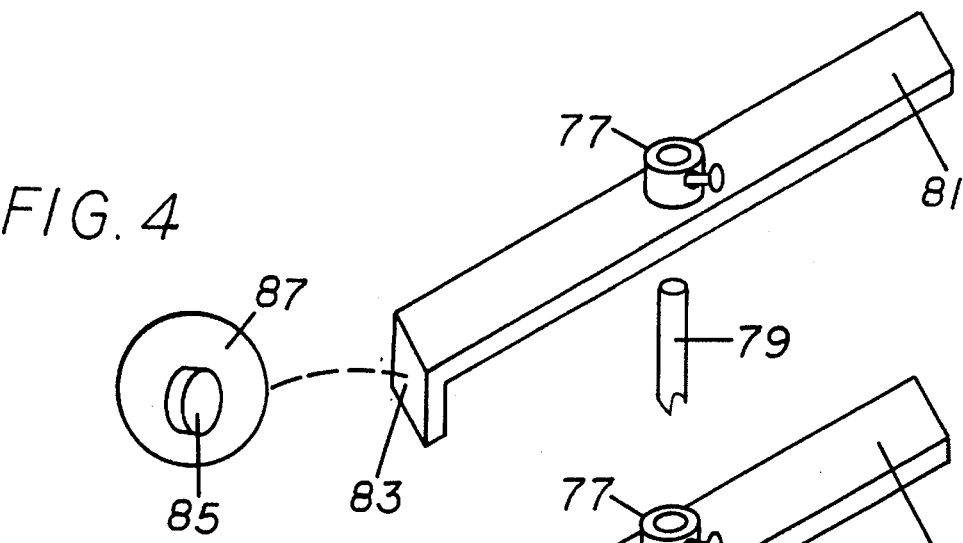
FIG. 4 is an alternate, metallic sweep arm void of permanent magnets and a magnetic lure ball having a strong attraction to the metallic sweep arm.

FIG. 4 is a perspective view of a metallic sweep arm 81 void of primary permanent magnets with a ninety degree bend 83 at one end, a portion of motor shaft 79 and a shaft hub with a set screw 77. The loose permanent magnet 85 within the shell of the lure ball 87 is strongly attracted to the ninety degree bend 83 of the metallic sweep arm 81. This alternate eliminates one permanent magnet.

Figure 5:
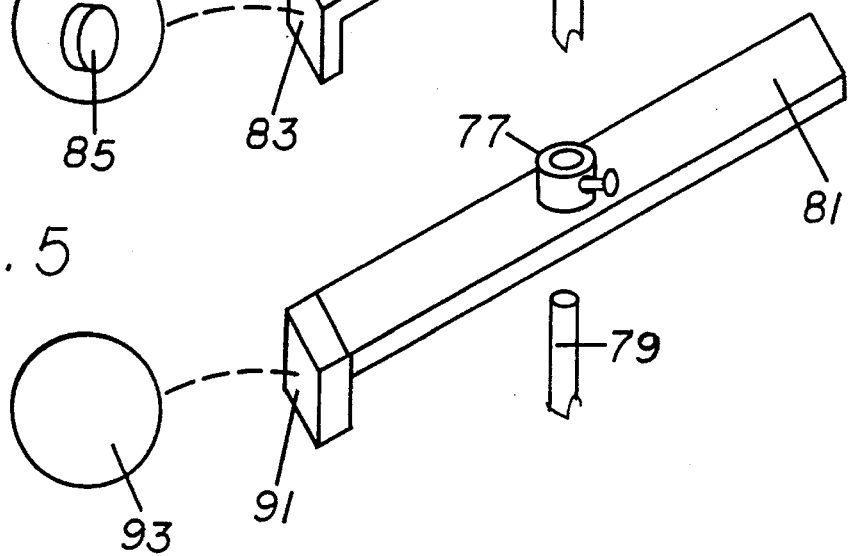
FIG. 5 is an alternate sweep arm containing one permanent magnet affixed at one end, having a strong attraction to a thin, metallic, ball shaped lure.

FIG. 5 is a perspective view of a sweep arm 81 made of a pre-selected material with a permanent magnet 91 affixed to one end of the sweep arm 81, a portion of motor shaft 79, and a shaft hub with a set screw 77. The permanent magnet 91 is strongly attracted to a thin metallic lure ball 93. This alternate also eliminates one permanent magnet.

Figure 6:
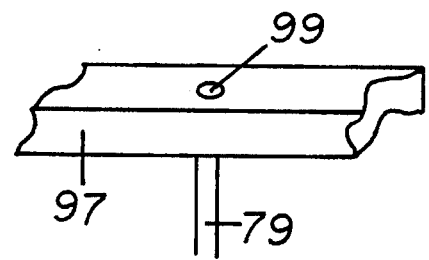
FIG. 6 shows a simple method of affixing a permanent bar magnet to a motor shaft whereby it is press-fit.

FIG. 6 is a perspective view of a typical mounting method, whereby an elongated permanent bar magnet 97 has a circular opening 99 for insertion of motor shaft 79 affixed by press fit or epoxy cementing.

CONCLUSION

Thus it has been shown that the animal exercise stimulator can perform all of the objectives as outlined above. Many other variations are possible. For example, it would be obvious to those already skilled in the art that may consider electromagnetic force fields in lieu of permanent magnets, or a combination thereof, or intermittantly powered motors to create a stop and go lure movement, or lures in other shapes mounted differently. It would be obvious to provide adjustable permanent magnets for various positioning, to vary the lures orbiting performance, or using sensors such as heat or motion to activate the device automatically, or electronic sound synthesizers, and further including mounting the device vertically for other purposes. While the above descriptions may contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. An animated ball and track attractant device for cats comprising:
   a) a housing forming a base and having a lower surface, a vertically oriented peripheral sidewall extending from said lower surface, and an upper surface supported by said peripheral sidewall said upper surface of said housing including means for permitting an animal to sink its claws therein and thus function as a scratching pad for the animal;
   b) a shaft below said upper surface of said housing;
   c) means for rotating said shaft disposed within said housing, said rotating means causing said shaft to rotate at a preselected rate of revolution;
   d) a continuous track encircling said vertically oriented peripheral sidewall, said continuous track having an open top to provide access to the interior thereof;
   e) an object disposed within said continuous track and freely movable therein; and
   f) means for producing a magnetic field coupled to said shaft and disposed within said housing, wherein rotation of said shaft causes said means for producing a magnetic field to rotate within said housing, the magnetic field produced thereby influencing said object to cause said object to move within said continuous track and orbit said housing.

2. The device of claim 1, wherein said housing is circular in cross-section and said continuous track comprises an annular ring.

3. The device of claim 1, wherein said means for rotating said shaft comprises an electric motor.

4. The device of claim 1, wherein said means for producing a magnetic field comprises an elongated arm mounted to said shaft at a right angle therewith and at least one permanent magnet affixed to an end of said arm remote from said shaft.

5. The device of claim 1, wherein said means for producing a magnetic field comprises a permanent magnet in the form of an elongated arm mounted to said shaft at a right angle therewith.

6. The device of claim 1, further comprising a reversing switch connected to said means for rotating said shaft such that the direction of rotation of said shaft may be selectively reversed.

7. The device of claim 1, wherein said movable object is a ball.

8. The device of claim 7, wherein said ball is formed of a metallic material.

9. The device of claim 7, wherein said ball is formed of a non-metallic material having a permanent magnet disposed therein.

10. The device of claim 9, wherein said ball is hollow and said permanent magnet is loosely confined within said hollow ball.

11. The device of claim 1, wherein said open top of said continuous track is partially covered so as to conceal a portion of the interior thereof.

12. An animated ball and track attractant device for cats comprising:

a) a circular housing forming a base and having a lower circular planar surface, a vertically oriented peripheral sidewall extending from said lower surface, and an upper circular planar surface supported by said peripheral sidewall, said upper surface of said housing including means for permitting an animal to sink its claws therein and thus function as a scratching pad for the animal;

b) a shaft below said upper surface of said housing and having an upper and a lower end;

c) a motor disposed within said housing and coupled to said lower end of said shaft;

d) a reversing switch connected to said motor for selectively reversing the direction of rotation of said motor;

e) a continuous annular track encircling said vertically oriented peripheral sidewall, said continuous track having an open top to provide access to the interior thereof;

f) an object disposed within said continuous track and freely movable therein; and g) an elongated arm mounted to said shaft at a right angle therewith and disposed within said housing and at least one permanent magnet affixed to an end of said arm remote from said shaft for producing a magnetic field, wherein rotation of said shaft causes said arm and said at least one magnet attached thereto to rotate within said housing, the magnetic field produced thereby influencing said object to cause said object to move within said continuous track and orbit said housing.

13. The device of claim 12, wherein said movable object is a ball.

14. The device of claim 13, wherein said ball is formed of a metallic material.

15. The device of claim 13, wherein said ball is formed of a non-metallic material having a permanent magnet disposed therein.

16. The device of claim 15, wherein said ball is hollow and said permanent magnet is loosely confined within said hollow ball.

\* \* \* \* \*